(12) United States Patent
Forsberg

(10) Patent No.: US 8,923,347 B2
(45) Date of Patent: Dec. 30, 2014

(54) DATA TRANSMISSION INVOLVING MULTIPLEXING AND DEMULTIPLEXING OF EMBEDDED CLOCK SIGNALS

(75) Inventor: Gunnar Forsberg, Stockholm (SE)

(73) Assignee: Transmode Systems AB, Stockholm (SE)

(*) Notice: Subject to any disclaimer, the term of this patent is extended or adjusted under 35 U.S.C. 154(b) by 178 days.

(21) Appl. No.: 13/643,706

(22) PCT Filed: Apr. 27, 2010

(86) PCT No.: PCT/EP2010/055613
§ 371 (c)(1),
(2), (4) Date: Oct. 31, 2012

(87) PCT Pub. No.: WO2011/134498
PCT Pub. Date: Nov. 3, 2011

(65) Prior Publication Data
US 2013/0039369 A1 Feb. 14, 2013

(51) Int. Cl.
| | |
|---|---|
| *H04J 3/06* | (2006.01) |
| *H04J 4/00* | (2006.01) |
| *H04W 4/00* | (2009.01) |
| *H04J 3/16* | (2006.01) |
| *H04L 5/26* | (2006.01) |
| *H04L 7/00* | (2006.01) |
| *H04L 5/14* | (2006.01) |
| *H04L 1/00* | (2006.01) |

(52) U.S. Cl.
CPC .............. *H04J 3/1664* (2013.01); *H04L 5/26* (2013.01); *H04L 7/0083* (2013.01); *H04L 5/14* (2013.01); *H04L 1/0025* (2013.01)
USPC ............ 370/510; 370/280; 370/314; 370/478

(58) Field of Classification Search
CPC ....... H04L 7/0083; H04L 5/14; H04L 1/0025; H04L 5/26

USPC .......................................................... 370/510
See application file for complete search history.

(56) References Cited

U.S. PATENT DOCUMENTS 3,569,631 A * 3/1971 Johannes et al. .............. 370/506
3,819,853 A 6/1974 Stein
(Continued)

FOREIGN PATENT DOCUMENTS

EP 2051420 A1 4/2009

OTHER PUBLICATIONS

The International Bureau of WIPO, International Preliminary Report on Patentability for International Application No. PCT/EP2010/055613, mailed Nov. 8, 2012, 5 pages, Switzerland.
(Continued)

Primary Examiner — Faruk Hamza
Assistant Examiner — Abu-Sayeed Haque
(74) Attorney, Agent, or Firm — Alston & Bird LLP

(57) ABSTRACT

In a data transmission system, a first node receives at least two sets of input data signals including at least two signals being based on different synchronization sources. The first node extracts a respective clock signal representing the embedded clock signals from the sources, samples and formats these signals for transmission according to a TDM structure. The TDM formatted signals are transmitted as at least one bit stream over a transmission medium to at least one second node, where the bit stream is demultiplexed into at least two sets of output data signals respective demultiplexed clock signals representing the sampled clock signals. A jitter attenuating mechanism reduces an amount of frequency jitter to below a predefined level to produce a respective clock signal having a synchronization quality superior to that of the demultiplexed clock signals. An interface module recombines each data signal with its associated clock signal.

25 Claims, 6 Drawing Sheets

(56) References Cited

U.S. PATENT DOCUMENTS

| | | | |
|---|---|---|---|
| 3,982,077 A | 9/1976 | Clark et al. | |
| 4,313,198 A * | 1/1982 | Mazzocchi | 370/542 |
| 4,873,684 A | 10/1989 | Kobayashi et al. | |
| 4,920,545 A | 4/1990 | Forsberg et al. | |
| 5,157,651 A * | 10/1992 | Ghelberg et al. | 370/233 |
| 5,173,901 A | 12/1992 | DeSomer | |
| 5,299,192 A * | 3/1994 | Guo et al. | 370/210 |
| 6,009,109 A | 12/1999 | Binder | |
| 6,888,826 B1 | 5/2005 | Martin et al. | |
| 6,987,424 B1 * | 1/2006 | Hein | 331/53 |
| 2002/0018493 A1 | 2/2002 | Robledo et al. | |
| 2003/0214977 A1* | 11/2003 | Kuo | 370/503 |
| 2004/0047427 A1* | 3/2004 | Dostert et al. | 375/260 |
| 2005/0078683 A1 | 4/2005 | Page | |
| 2005/0220180 A1* | 10/2005 | Barlev et al. | 375/222 |
| 2006/0146882 A1* | 7/2006 | Kim | 370/485 |
| 2007/0116061 A1* | 5/2007 | Meagher et al. | 370/503 |
| 2008/0025237 A1 | 1/2008 | Yamada | |
| 2008/0025346 A1 | 1/2008 | Takahashi | |
| 2008/0193125 A1* | 8/2008 | Weber et al. | 398/25 |
| 2010/0198590 A1* | 8/2010 | Tackin et al. | 704/214 |

OTHER PUBLICATIONS

International Searching Authority, International Search Report for International Application No. PCT/EP2010/055613, mailed Nov. 9, 2010, 4 pages, European Patent Office, The Netherlands.

International Telecommunication Union Members, "Series G: Transmission Systems and Media, Digital Systems and Networks, Digital Networks-Quality and Availability Targets, The Control of Jitter and Wander Within Digital Networks Which Are Based on the 2048 kbit/s Hierarchy," ITU-T Recommendation G.823, Mar. 2000, 50 pages, <www.itu.int/rec/dologin_pub.asp?lang=e&id=T-REC-G.823 . . . >.

International Telecommunication Union Members, "Series G: Transmission Systems and Media, Digital Systems and Networks, Digital Networks-Design Objectives for Digital Networks, Timing Characteristics of SDH Equipment Slave Clocks (SEC), Corrigendum 1," ITU-T Recommendation G.813 (1996) Corrigendum 1, Nov. 2001, 10 pages, <http://www.itu.int/rec/T-REC-G.813-200111-S!Cor1/en>.

* cited by examiner

DATA TRANSMISSION INVOLVING MULTIPLEXING AND DEMULTIPLEXING OF EMBEDDED CLOCK SIGNALS

CROSS REFERENCE TO RELATED APPLICATIONS

This application is a national stage application, filed under 35 U.S.C. §371, of International Application No. PCT/EP2010/055613, filed Apr. 27, 2010, which is hereby incorporated by reference in its entirety.

BACKGROUND OF THE INVENTION

1. Related Field

The present invention relates generally to data transmission wherein digital signals are multiplexed and demultiplexed. More particularly the invention relates to a data transmission system according to the preamble of claim 1 and a method according to the preamble of claim 14. The invention also relates to a computer program according to claim 24 and a computer readable medium according to claim 25.

2. Description of Related Art

In telecommunication systems of Synchronous Digital Hierarchy (SDH) type, the synchronization signals may be carried by so-called E1 signals (2.048 Mbit/s). Similarly, in Synchronous Optical Networking (SONET) systems, the synchronization signals may be carried by so-called T1 signals (1.544 Mbit/s). In both cases it is the inherent clock frequency of the signals E1/T1 (i.e. 2.048 MHz and 1.544 MHz respectively) that carries the synchronization information through the systems.

A telecommunication system normally uses atomic clocks to create the synchronization signals. These signals (e.g. of E1 type) are then transported through the network, and far out in the network the signals may be fed to a base station having a radio interface. In such a case, the synchronization signals will control the radio frequencies transmitted by the base station for communication with for example cell phones. Hence, even very small fluctuations of the clock frequencies, may cause substantial performance problems. To avoid this kind of problems, the wander of the synchronization signals must be lower than predefined limits, e.g. as specified in the standards ITU-T G.823 and ITU-T G.813.

Typically, each mobile operator distributes a separate clock signal in its network. A so-called backhaul operator may provide network resources for two or more mobile operators. This means that in a given physical network signals originating from different clock sources may have to co-exist. Furthermore, multiple mobile operators may sometimes share a specific base station site. Such a site is a location, e.g. a tower, where a plurality of base stations may be installed. A site sharing situation may arise when one backhaul operator serves a number of mobile operators via one base station (or cell) site. Here, the technical problem for the backhaul operator is to send the different synchronization signals, together with the traffic signals, to the respective mobile operator at the cell site as efficiently as possible.

Let us assume that E1 signals are used. Then, each mobile operator uses his own atomic clock to generate all the E1 signals in his system. Since these E1 signals all originate from the same source (in most cases an atomic clock), a group of E1 signals from a given mobile operator may be referred to as a particular synchronization group.

For example, an STM-1 signal of 155.52 Mbps may carry up to 63 E1 signals and all these E1 signals would then belong to the same synchronization group. The atomic clock for this synchronization group controls the frequency corresponding to the bit rate, namely 155.52 MHz. The 155.52 MHz frequency will therefore be extremely exact because it originates from an exact clock. The inherent frequency of the E1 signals will be 2.048 MHz and this frequency will also be extremely exact due to that 2.048 MHz is exactly 16×155.52/1215=2.048 MHz. This means that if for example the 155.52 MHz is multiplied with 16 (e.g. with a phase locked loop, PLL) and divided by 1215, an exact clock frequency of 2.048 MHz would be generated. Alternatively, the frequency 2.048 MHz can be generated directly from 155.52 MHz by using so called fractional division.

Nevertheless, it has proven to be very difficult to transmit two or more data or clock signals on a multiplex format with good synchronization quality/phase accuracy via a common medium. This is especially true if the signals have the same nominal frequencies, however where the signals show slight frequency deviations relative to one another. In particular, difficulties are here encountered in the demultiplexing process, where the wander must be sufficiently low, for instance to meet the requirements of given a telecom standard, such as ITU-T G.813. The term "wander" is defined as low frequency jitter, normally up to 10 Hz.

When transferring a single signal, so-called low-factor oversampling may be employed to preserve phase information. By low-factor oversampling is here understood a factor higher than one, however typically lower than two. U.S. Pat. No. 3,819,853, U.S. Pat. No. 4,920,545 and U.S. Pat. No. 6,009,109 show different solutions of this type. Unfortunately, neither of these approaches as such can be used to tackle the above-mentioned problem.

In the prior art, the problem has instead been avoided by embedding the necessary synchronization signals in the packets of Ethernet streams. Thereby, it has been possible to reconstruct an original signal on a receiver side, and thus through the use of packets, emulate a so-called circuit connection. This strategy is often referred to as "Pseudo Wire" or the high precision time synchronization protocol IEEE 1588 V.2.

U.S. Pat. No. 4,873,684 shows system for multiplexing, transmitting and demultiplexing signals having different frequencies. Here, a reference sample signal is used, which is obtained by multiplying a frequency equal to, or higher than, the frequency of the maximum frequency among the transmitted signals with the number of transmitted signals. Each signal to be transmitted is sampled based on the reference sample signal before being multiplexed into the time division format. Any empty time slots are filled with a dummy signal. Consequently, the frequency requirements may become extreme, and substantial bandwidth resources risk being wasted.

US 2008/0025346 describes a solution for synchronizing and multiplexing asynchronous signals. Here, so-called frame phase absorption is carried out with respect to the incoming asynchronous signals. As a result, synchronous signals are generated to which pointer values are assigned that describe the asynchronous properties. The synchronous signals are then multiplexed through processing of changing pointer values by a pointer transmission section.

US 2002/0018493 reveals a digital data transmission system, wherein a plurality of data signals are embedded in a carrier signal using a time division multiplex (TDM) operation. Rate matching is here undertaken between the data signals and the carrier signal by means of stuff locations. Data to be stuffed and the management information for the reassignment are embedded in a path layer overhead of the carrier signal superframe.

U.S. Pat. No. 6,888,826 discloses a solution, which enables multiple clock signals to share processing resources. Here, pointers are stored in FIFO buffers, and this in turn, renders it possible to compensate for timing differences between a system clock and the respective outgoing line clock signals, so that the clock signals can be regenerated on the receiver side.

US 2005/0078683 describes a data communication system for transferring one or more payload streamed data signals and an auxiliary data signal via a common medium. The auxiliary data signal is organized as data packets, and a transmission data formatter formats these packets into a streamed data signal format.

Then, the signal is multiplexed with the payload streamed data signals into a bit stream for transmission.

Despite the various TDM-based approaches described above, there is no prior solution enabling the transmission of two or more data or clock signals on a multiplex format via a common medium with a sufficiently high phase accuracy to meet the wander requirements of today's most important telecom standards, if said signals are based on different synchronization sources.

BRIEF SUMMARY

The object of the present invention is to solve the above problem and provide an efficient and reliable means of multiplexing, transferring and demultiplexing a number of signals being controlled by at least two different clock sources.

According to one aspect of the invention, the object is achieved by the data transmission system as initially described, wherein the at least two sets of input data signals include at least one first signal and at least one second signal. The at least one first signal is here based on a synchronization source, which is different from a synchronization source upon which the at least one second signal is based. Moreover, the first node includes at least one clock extraction module, at least one sampling module and a multiplexing module. The at least one clock extraction module is configured to, from the at least one first and second signals, extract a respective clock signal representing each of the different synchronization sources. The at least one sampling module is configured to sample each of the extracted clock signals to a respective resulting sampled clock signal. This sampling is based on a sampling frequency, which is synchronized with the line frequency used for transmitting the resulting bit stream over the transmission medium to the second node. The multiplexing module is configured to include each of the resulting sampled clock signals as a respective separate signal in the TDM structure. The second node includes a demultiplexing module, at least one jitter attenuating means and at least one interface module. The demultiplexing module is configured to demultiplex the received bit stream into at least two sets of output data signals and a set of demultiplexed clock signals representing the resulting sampled clock signals. The at least one jitter attenuating means is configured to, in each signal in the set of demultiplexed clock signals, reduce an amount of frequency jitter to below a predefined level, and thus produce a respective clock signal having a synchronization quality superior to that of the signals in the set of demultiplexed clock signals. The at least one interface module is configured to recombine each data signal in the at least two sets of output data signals with its associated stabilized clock signal into a respective resulting clock-carrying data signal.

This design is advantageous because it enables preservation of very high timing accuracy also when transmitting multiple data signals being based on different synchronization sources having the same nominal frequency, however slightly different drifts around this frequency.

According to one preferred embodiment of this aspect of the invention, the second node includes at least one narrow-band jitter attenuating means configured to, in each signal in the set of demultiplexed clock signals, reduce an amount of frequency jitter to below a predefined level, and thus produce a respective stabilized clock signal.

Preferably, the at least one narrow-band jitter attenuating means includes a buffer module. This module is configured to consecutively receive bits of the output data signal at an input rate specified by the demultiplexed clock signal that is associated with the output data signal in question. The buffer module temporarily stores a predetermined number of bits of the demultiplexed data signal, and thereafter the module is configured to feed out the bits to a line adapter module. The bits are fed out consecutively at a final output rate specified by a phase-locked-loop which, in turn, is controlled by the stabilized clock signal associated with the output data signal in question, where the stabilized clock signal, in turn, is based on the demultiplexed clock signal. The line adapter module is configured to consecutively forward the output bits to an output terminal at the final output rate to thus represent the resulting clock-carrying data signal from the second node. By this simple arrangement, any frequency deviations in the resulting clock-carrying data signal can be held sufficiently low to meet the wander requirements of any existing telecom standard.

According to another preferred embodiment of this aspect of the invention, the second node includes at least one narrow-band jitter attenuating means configured to, in each signal in the set of demultiplexed clock signals, reduce an amount of frequency jitter to below a predefined level, and thus produce a respective stabilized clock signal. Preferably, at least one of the at least one narrow-band jitter attenuating means is integrated into at least one of the at least one interface module. This is advantageous, since it provides an efficient design and circuit usage.

According to yet another preferred embodiment of this aspect of the invention, the second node includes at least one broad-band jitter attenuating module. Each such module is configured to receive a respective demultiplexed clock signal, and reduce frequency jitter above a threshold frequency in said demultiplexed clock signal, thereby producing resulting cleaned demultiplexed clock signals. Thereafter, the broad-band jitter attenuating module is configured to forward the resulting cleaned demultiplexed clock signals to the at least one narrow-band jitter attenuating means. Thus, jitter having relatively broad bandwidth is prevented from being mixed down and then reach the at least one interface module.

According to still other preferred embodiments of this aspect of the invention, at least one of the at least one broad-band jitter attenuating module includes a phase-locked-loop circuit and/or a resonant circuit configured to reduce the frequency jitter above a threshold frequency. Hence, the propagation of broad-band jitter can be prevented in a straightforward manner.

According to a further preferred embodiment of this aspect of the invention, at least one of the at least one broad-band jitter attenuating module includes a clock regenerator. This unit is configured to receive each demultiplexed clock signal and repeatedly produce a respective average period length value representing an average period time for the demultiplexed clock signal over an averaging interval including a number of clock periods. The clock regenerator is further configured to produce the cleaned demultiplexed clock signal based on said average period length values. Thereby, a highly robust clock signal is obtained. The design is further advantageous because the clock regenerator can be implemented very efficiently in terms of required chip area, for instance in an FPGA (field-programmable gate array).

According to another preferred embodiment of this aspect of the invention, the demultiplexing module is configured to produce a read-out clock signal in respect of each of the different synchronization sources. The read-out clock signal includes trains of clock pulses, where each train of clock pulses contains a number of clock pulses equal to the number of bits included in each frame of the TDM structure. The second node further includes at least one buffer means which is configured to receive bits of the output data signal consecutively at an input rate specified by the read-out clock signal, temporarily store a predetermined number of the received bits of the demultiplexed data signal, and thereafter feed out said bits consecutively at an output rate specified by the cleaned demultiplexed clock signal. Hence, the interface module is provided with a high-quality basis for generating the resulting clock-carrying data signals.

According to yet another preferred embodiment of this aspect of the invention, the at least one sampling module of the first node is configured to sample each of the extracted clock signals based on a sampling frequency that represents an oversampling factor relative to the frequency of the extracted clock signal in question. The oversampling factor is at least above 1, and preferably above 1.25. Further preferably, the oversampling factor is around 1.5 to 1.75. Thereby, jitter in the data as well as in the clock signals can be handled, and at the same time the bandwidth of the transmission medium is economized.

According to yet a further preferred embodiment of this aspect of the invention, the first node includes at least one divider module configured to receive each extracted clock signal, and in response thereto produce a resulting downconverted extracted clock signal having a reduced frequency relative to the frequency of the extracted clock signal. The reduced frequency here represents a predetermined fraction of the frequency of the extracted clock signal. The predetermined fraction may be ½, such that the resulting downconverted extracted clock signal becomes a so-called half-clock. However, technically, any other fraction is conceivable according to the invention. In any case, the divider module further relaxes the bandwidth requirements on the transmission medium.

According to another preferred embodiment of this aspect of the invention, and provided that the first node includes at least one divider module, the second node includes at least one multiplier module. This module is configured to multiply each demultiplexed sampled clock signal, or the cleaned version thereof, with a factor representing the inverse of the above-mentioned predetermined fraction before feeding the clock signal to the interface module. Thus, the extracted clock signals are recreated.

According to still another preferred embodiment of this aspect of the invention, the first node includes at least one data extraction module configured to extract a respective data signal representing the payload information of each of the input data signals. The multiplexing module is further configured to include each of the extracted data signals as a respective separate signal in the TDM structure. Consequently, the TDM structure contains both the extracted data signals and the sampled clock signals.

According to another aspect of the invention, the object is achieved by the method described initially, wherein the at least two sets of input data signals include at least one first signal and at least one second signal. The at least one first signal is here based on a synchronization source, which is different from a synchronization source upon which the at least one second signal is based. The method further involves the steps of: extracting, in the first node, a respective clock signal representing each of said different synchronization sources from said at least one first and second signals; sampling, in the first node, each of the extracted clock signals to a respective resulting sampled clock signal based on a sampling frequency, which is synchronized with the line frequency; multiplexing, in the first node, each of the resulting sampled clock signals as a respective separate signal in the TDM structure; demultiplexing, in the second node, the received bit stream into at least two sets of output data signals and a set of demultiplexed clock signals representing the resulting sampled clock signals; jitter-attenuating, in the second node, in each signal in the set of demultiplexed clock signals to reduce an amount of frequency jitter to below a predefined level clock signal having a synchronization quality being superior to the synchronization quality of the signals in the set of demultiplexed clock signals; and recombining, in the second node, each data signal in the at least two sets of output data signals with its associated stabilized clock signal into a respective resulting clock-carrying data signal. The advantages of this method, as well as the preferred embodiments thereof, are apparent from the discussion above with reference to the proposed data transmission system.

According to a further aspect of the invention the object is achieved by a computer program, which is directly loadable into the memory of a computer, and includes software adapted to implement the method proposed above when said program is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE FIGURES

The present invention is now to be explained more closely by means of preferred embodiments, which are disclosed as examples, and with reference to the attached drawings.

DETAILED DESCRIPTION OF VARIOUS EMBODIMENTS

Figure 1:
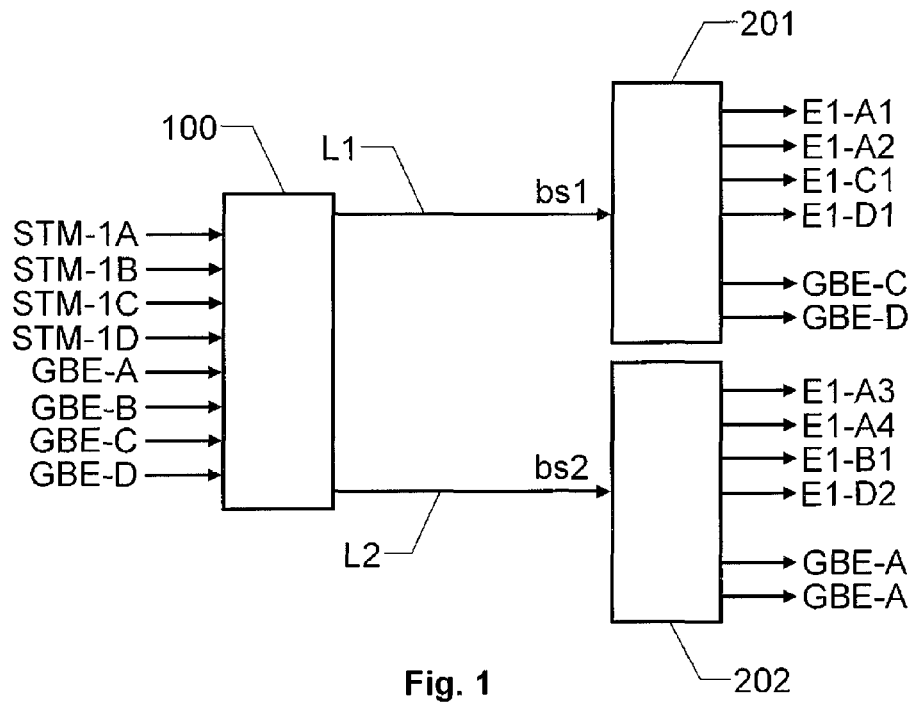
FIG. 1 shows a schematic block diagram of a node configuration to which the invention is applicable.

We refer initially to FIG. 1, which shows a block diagram illustrating a node configuration to which the present invention is applicable.

For reasons of a clear presentation, FIG. 1 only shows data traffic and synchronization propagating via a first transmission line L1 and a second transmission line L2 from a first node 100 to two second nodes 201 and 202 respectively. However, in an actual system, data traffic will typically also flow in the opposite direction. Normally, however, it is only necessary to send precise synchronization signals in one direction, which here is exemplified from the first node 100 to the second nodes 201 and 202. This is especially true if the first node 100 is a so-called hub node and the second nodes 201 and 202 are access nodes of a mobile telecommunication system, where the access nodes may represent equipments at different cell sites. It should further be understood that although FIG. 1 only shows two access nodes, in an actual system, a larger number of access nodes may be connected to one hub node, say 8.

In FIG. 1, sets of input data signals is represented by STM-1 signals STM-1A, STM-1B, STM-1C and STM-1D and Gigabit Ethernet signals GBE-A, GBE-B, GBE-C and GBE-D. The invention, however, is not limited to these signal formats. On the contrary, many additional different types of signals may be transmitted from the first node 100 to one or more second nodes 201 and 202. The first and second transmission lines L1 and L2 respectively may include optical fiber cables interconnecting various cell sites. In such a case, each transmission line L1 and L2 typically utilizes a single wavelength for this application. Thus, one wavelength may transport a number of different synchronization signals, which is impossible according to the previously known solutions.

In most cases, each mobile operator provide their own atomic clock signal as a synchronization source for the base stations of their respective telecommunication system.

In FIG. 1, we can assume that a first mobile operator uses the STM-1A signal to provide synchronization in his system, a second mobile operator uses the STM-1B signal to provide synchronization in his system, a third mobile operator uses the STM-1C signal to provide synchronization in his system and a fourth mobile operator uses the STM-1D signal to provide synchronization in his system.

The STM-1A signal, in turn, may contain up to 63 E1 signals, say referred to as E1-A1 through E1-A63. Consequently, in FIG. 1 the E1 signals E1-A1, E1-A2, E1-A3 and E1-A4 originate from the STM-1 signal STM-1A, and therefore these signals are all based on a first synchronization source here having the frequency 2.048 MHz.

Similarly, the E1 signal E1-B1 originates from the STM-1 signal STM-1B of the second mobile operator, which is based on a second synchronization source having the frequency 2.048 MHz; the E1 signal E1-C1 originates from the STM-1 signal STM-1C of the third mobile operator, which is based on a third synchronization source having the frequency 2.048 MHz; and the E1 signals E1-D1 and E1-D2 originate from the STM-1 signal STM1D of the fourth mobile operator, which is based on a fourth synchronization source having the frequency 2.048 MHz.

In the example of FIG. 1, the E1 signals originating from the STM-1 signals are terminated at the second nodes 201 and 202.

Nevertheless, aided by a network management system, the inherent E1 signals can be distributed from a hub node to access nodes in any combination.

Figure 2A:
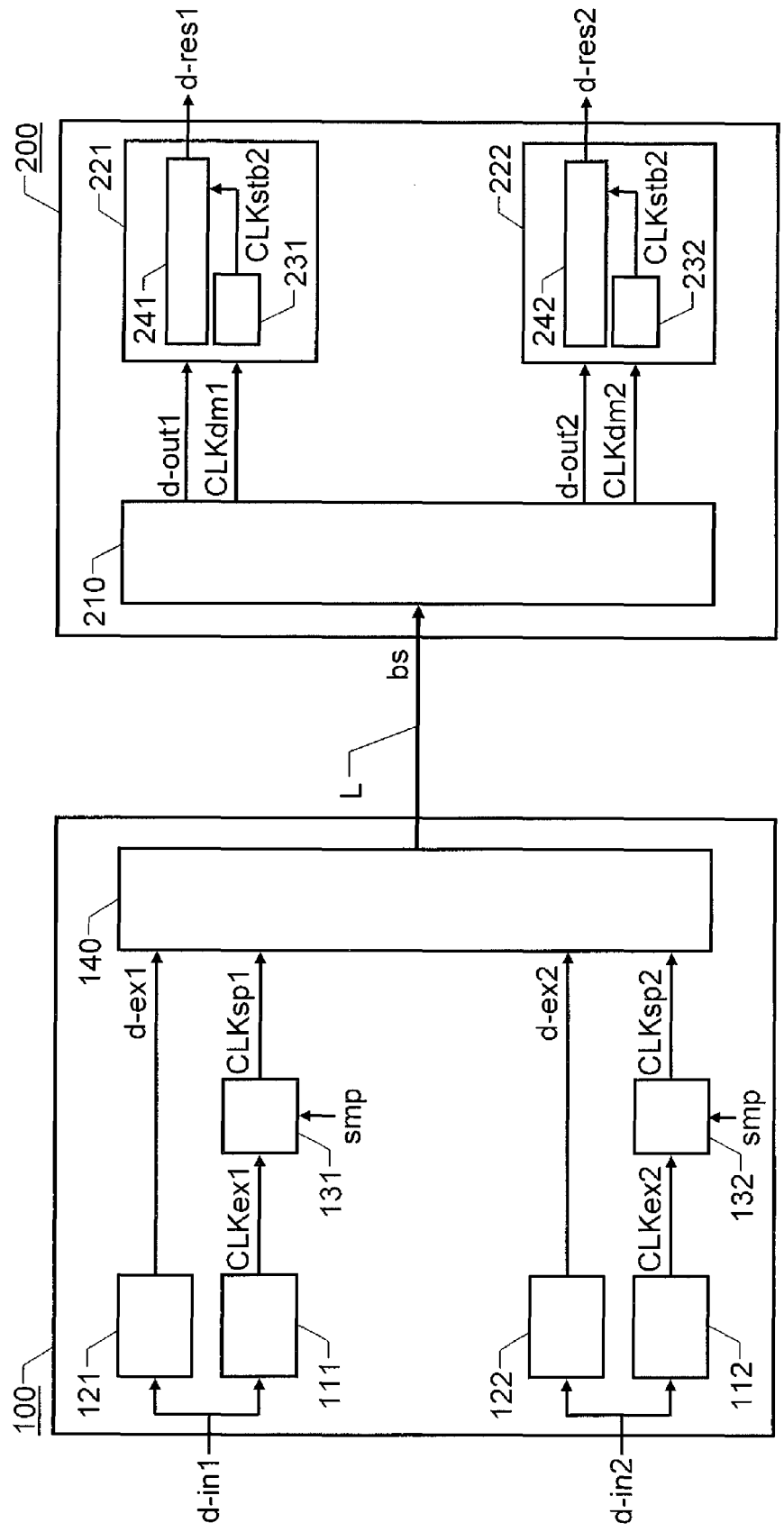
FIG. 2a shows a block diagram of a data transmission system according to a first embodiment of the invention.

FIG. 2a shows a block diagram of a data transmission system according to a first embodiment of the invention.

The system includes a first node 100, a second node 200 and a transmission medium L interconnecting the first and second nodes 100 and 200.

The first node 100 is configured to receive sets of input data signals d-in1 and d-in2, and format the signals, or at least a subset of each set of signals, for transmission according to a TDM structure. The sets of input data signals d-in1 and d-in2 include at least two data signals, each into which a clock signal is embedded. Specifically, the sets of input data signals d-in1 and d-in2 include at least one first signal and at least one second signal, where the at least one first signal is based on a synchronization source different from a synchronization source upon which the at least one second signal is based.

The transmission medium L is configured to transmit the TDM formatted signals as a bit stream bs. The bit stream bs, in turn, has a line frequency adapted to the bandwidth requirements of the TDM formatted signals.

The bit stream bs may have a bit rate of 2.5 Gbps. This would be sufficient to transfer from the first node 100 to a single second node 200: input data signals being based on two different synchronization sources, where each synchronization source in sampled into a resulting sampled clock signal of 3.125 Mbps; sixteen E1 signals, each having a bit rate of 2.048 Mbps; two GBE signals, each having a bit rate of 1015.625 Mbps (64B/65B encoding) plus overhead data of up to 429.732 Mbps. Here, 64B/65B encoding means a format wherein 64 bits are encoded into 65 bits, and the figure 1015.625 is thus derived as (65/64)×1000.

Further, the bit streams representing each of the synchronization sources can either be regarded as a respective almost jitter free 3.125 Mbps stream, or as a respective 2.048 Mbps stream (of 101010-type) with relatively large peak to peak jitter corresponding to the period of the oversampling frequency. This means that the peak-to-peak jitter becomes 320 ns. Since the 3.125 Mbps bit stream bs has a clock frequency in perfect synchronism with the line frequency, it is a trivial task to transmit these bits in a TDM frame having the same number of bits per frame in each frame.

The line frequency is, however, not synchronized to the 2.048 MHz frequency. Therefore, if a TDM structure including E1 signals is used, the number of bits per E1 and per frame must vary due to frequency drift between line frequency and the frequency 2.048 MHz of the E1 signal. This can however be handled by a multiplexing module 140 in the first node 100 by including information in each frame concerning the number of bits included in that frame.

The resulting bit stream is then sent over the transmission medium L, e.g. a fiber optic cable. The bit rate may here be 2.5 Gbps (i.e. 2500 Mbps), which is suitable because the frequency 3.125 MHz may be generated as 2500/800=3.125.

The second node 200 is configured to receive the bit stream bs and demultiplex the bit stream bs into two sets of output data signals d-out1 and d-out2.

The first node 100 includes at least one clock extraction module 111 and 112 respectively, at least one sampling module 131 and 132 and the multiplexing module 140. Preferably, the first node 100 also includes at least one data extraction module 121 and 122.

The at least one data extraction module 121 and 122 is configured to extract a respective set of data signals d-ex1 and d-ex2 representing the payload information of each of the sets of input data signals d-in1 and d-in2.

The multiplexing module 140 is configured to include each signal in the extracted sets of data signals d-ex1 and d-ex2 as a respective separate signal in the TDM structure.

Each clock extraction module 111 and 112 is configured to extract, from the at least one first and second signals, a respective clock signal CLKex1 and CLKex2 representing each of the different synchronization sources.

The at least one sampling module 131 and 132 is configured to sample each of the extracted clock signals CLKex1 and CKLex2 to a respective resulting sampled clock signal CLKsp1 and CLKsp2. The sampling is here based on a sampling frequency smp, which is synchronized with the line frequency. Preferably, the at least one sampling module 131 and 132 is configured to sample each of the extracted clock signals CLKex1 and CLKex2 respectively based on a sampling frequency representing an oversampling factor above 1 relative to the frequency of the extracted clock signal CLKex1 and CLKex2 in question. Further preferably, the oversampling factor is above 1.25, and most preferably around 1.5 to 1.75. Nevertheless, it is advantageous if a quotient Y/X representing the oversampling factor does not have a low denominator fraction, e.g. ½ or ⅔, which can cause the edges of the extracted clock signals CLKex1 and CKLex2 to be unevenly distributed, and thus cause an incorrect phase representation. Consequently, oversampling factors like 1.52 and 1.77 are better than 1.5 (i.e. 3/2) and 1.75 (i.e. 7/4) respectively. By selecting an appropriate oversampling factor, a degree of jitter in the signals of the extracted sets of data signals d-ex1 and d-ex2 and the extracted clock signal CLKex1 and CLKex2 can be handled. At the same time, the bandwidth of the transmission medium L is economized.

In this context it is worth mentioning that a clock of frequency $f_{CLK}$ Hz corresponds to a data signal having an endless 01010-pattern at a bit rate 2 $f_{CLK}$ bps. Hence, when sampling a clock signal, the oversampling factor OF is determined as the ratio between the sampling frequency $f_{smp}$ and the rate of the data signal equivalent to the clock signal to be sampled, i.e. OF=$f_{smp}$/(2 $f_{CLK}$).

The multiplexing module 140 is further configured to include each of the resulting sampled clock signals CLKsp1 and CLKsp2 as a respective separate signal in the TDM structure.

The second node 200 includes a demultiplexing module 210, at least one jitter attenuating means (for example represented by narrow-band jitter attenuating means 231 and 232 in FIG. 2a), and at least one interface module 221 and 222.

The demultiplexing module 210 is configured to demultiplex the received bit stream bs into sets of output data signals d-out1 and d-out2 respective a set of demultiplexed clock signals CLKdm1 and CLKdm2 representing the resulting sampled clock signals CLKsp1 and CLKsp2. Here, each set of output data signals d-out1 and d-out2 normally includes a plurality of data signals, say 8; and the set of demultiplexed clock signals CLKdm1 and CLKdm2 represent a number of clock signals equal to the number of synchronization sources included in the sets of input data signals d-in1 and d-in2.

The at least one narrow-band jitter attenuating means 231 and 232 is configured to, in each signal in the set of demultiplexed clock signals CLKdm1 and CLKdm2, reduce an amount of frequency jitter to below a predefined level. Thus, as a result, a respective stabilized clock signal CLKstb1 and CLKstb2 is produced. Preferably, at least one of the at least one narrow-band jitter attenuating means 231 and 232 is associated with a respective data-feed module 241 and 242, and is integrated together there with into at least one of the at least one interface module 221 and 222. Namely, this provides an efficient overall design and circuit usage. Further details concerning the interface module will be presented below with reference to FIG. 3. The at least one interface module 221 and 222 is configured to recombine each data signal in the sets of output data signals d-out1 and d-out2 with its associated stabilized clock signal CLKstb1 and CLKstb2 respectively into a respective resulting clock-carrying data signal in a set of data signals d-res1 and d-res2 respectively.

Figure 2B:
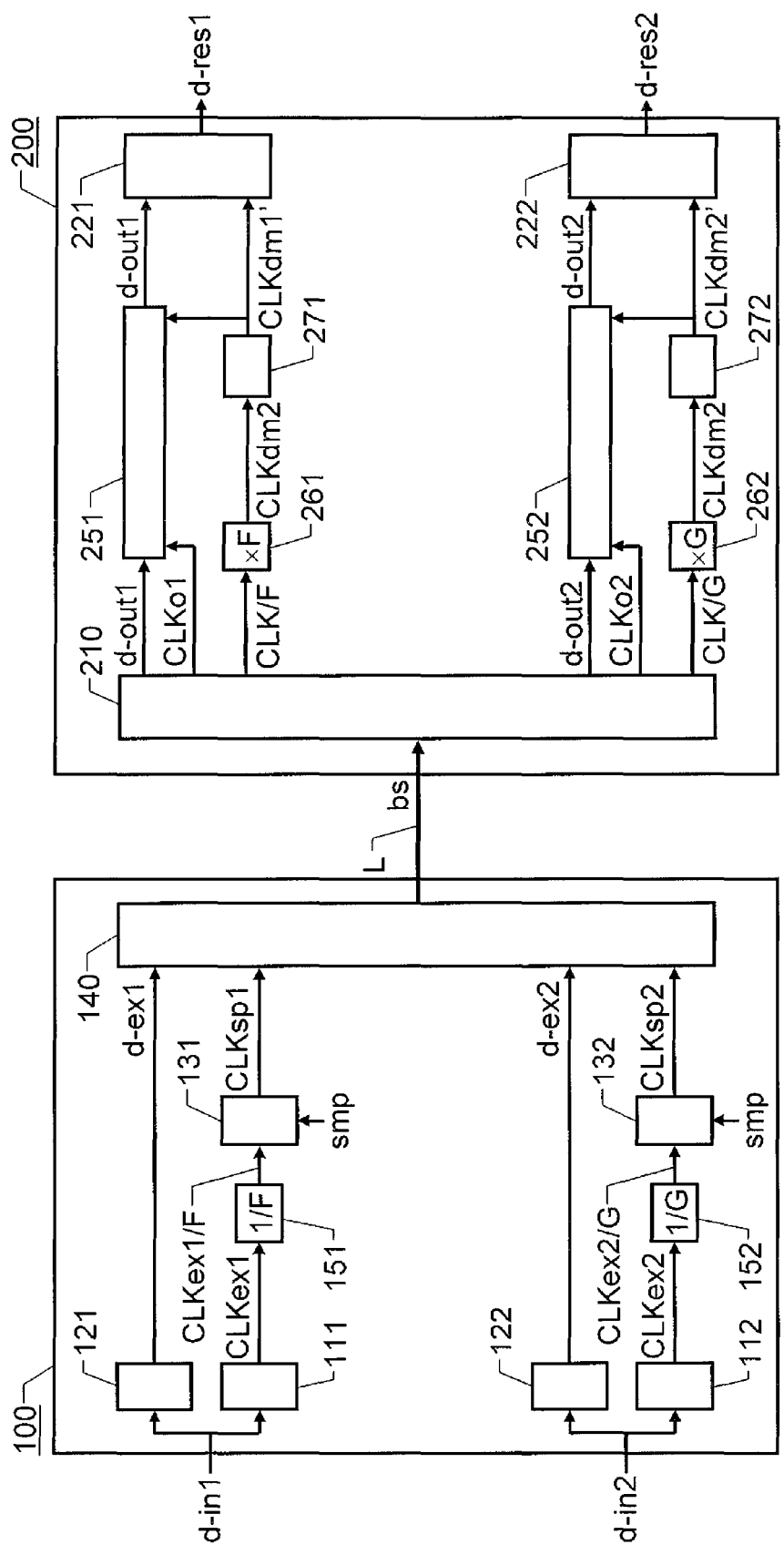
FIG. 2b shows a block diagram of a data transmission system according to a second embodiment of the invention.

FIG. 2b shows a block diagram of a data transmission system according to a second embodiment of the invention. In FIG. 2b, all units, signals and values bearing the same reference signs as those also occurring in FIG. 2a designate the same units, signals and values respectively as described above with reference to FIG. 2a, and will therefore not be repeated below.

According to one preferred embodiment of the invention, the second node 200 includes at least one broad-band jitter attenuating module. In the embodiment shown in FIG. 2b, two broad-band jitter attenuating modules 271 and 272 respectively are included in the second node 200.

Each module 271 and 272 is configured to receive a respective set of demultiplexed clock signals CLKdm1 and CLKdm2, reduce frequency jitter above a threshold frequency in this set of demultiplexed clock signals, and thereby produce resulting cleaned demultiplexed clock signals CLKdm1' and CLKdm2' respectively. The broad-band jitter attenuating modules 271 and 272 respectively then forward the resulting cleaned demultiplexed clock signals CLKdm1' and CLKdm2' to the at least one narrow-band jitter attenuating means 231 and 232 (cf. FIG. 2a), which in FIG. 2b are presumed to be integrated into the interface modules 221 and 222 respectively.

An important purpose of the broad-band jitter attenuating modules 271 and 272 is to reduce the effects of any jitter being mixed down into a critical spectrum. A relatively unknown problem relates to the fact that a frequency divider, such as each of the divider modules 151 and 152 in the first node 100, in addition to reducing the frequency of the resulting signal also mixes down jitter, or phase modulation. If for example a clock frequency of 2.048 MHz is connected to a divide by 64 divider, it is well known that the output frequency becomes 32 kHz (i.e. 2.048 MHz/64). What is less well known is that if in the same example the 2.048 MHz signal is phase modulated with a 32001 Hz signal, the output from the divider will have a jitter (or phase modulation) of only 1 Hz. This signal, in turn, may very well be within the PLL bandwidth, which renders it highly difficult to filter out the signal component in question. Analogously, a 31999 Hz jitter, will likewise cause a 1 Hz jitter at the output of the divider.

The applicant has carried out simulations and measurements, which show that in the above example, high frequency jitter will be down mixed to low frequency base band jitter, if the high frequency jitter has the frequencies 32 kHz, 64 kHz, 96 kHz, 128 kHz, and so on. The simulations and measurements have further shown that such down mixing causes large amounts of unwanted wander, which is unacceptable when transferring synchronization signals like the sampled clock signals CLKsp1 and CLKsp2.

For instance, if no pre-filtering is performed, the wander in the resulting signal due to down mixing, may result in wander larger than 5 ns in the interval −15 ppm to 15 ppm. To reduce this effect, an applied pre-filter should have a substantial jitter attenuation of frequencies according to the expression:

$$M \times \frac{f}{N}$$

Where M=1, 2, 3, 4, . . .
f=source signal frequency
Hence, for N=64, and f=2.048 MHz there should be a substantial jitter attenuation at 32 kHz, 64 kHz, 96 kHz, and so on. With this kind of pre-filtering, high frequency jitter will be prevented from mixing down to low frequency jitter, or wander.

The broad-band jitter attenuating modules 271 and 272 therefore have this filtering function. The modules 271 and 272 may be implemented through different technologies. According to embodiments of the invention, these modules 271 and 272 (or clock pre-filters) may include a PLL, a resonant circuit or a so-called clock regenerator.

Specifically, at least one of the at least one broad-band jitter attenuating module 271 and 272 may include a PLL circuit configured to reduce the frequency jitter above a threshold frequency.

Alternatively, or as a complement thereto, at least one of the at least one broad-band jitter attenuating module 271 and 272 may include a resonant circuit configured to reduce the frequency jitter above a threshold frequency.

As yet another alternative, or complement, at least one of the at least one broad-band jitter attenuating module 271 and 272 may include a novel type of clock regenerator. This unit is configured to: receive each demultiplexed clock signal CLKdm1 and CLKdm2; produce, repeatedly, a respective average period length value representing an average period time for the demultiplexed clock signal CLKdm1 and CLKdm2 over an averaging interval including a number of clock periods; and produce the cleaned demultiplexed clock signal CLKdm1' and CLKdm2' based on said average period length values. This averaging results in that the frequency jitter above a threshold frequency is reduced in the signals CLKdm1' and CLKdm2' respectively.

To elucidate the operating principle of the proposed novel type of clock regenerator, we refer to Table 1 below. Table 1 illustrates, via a decimal-value example, how an average period length value $PL_{avg}$ is determined over a rolling averaging interval of four cycles of an input clock signal $CLK_{in}$, and how based thereon, a stabilized output clock signal $CLK_{out}$ is produced. It should be noted that the averaging interval of four cycles is here only selected to provide an illustrating example. In an actual implementation a much longer interval is preferably used, e.g. representing 128 cycles of the input clock signal $CLK_{in}$.

Column 2 of Table 1 represents values of the periods of the input clock $CLK_{in}$. As can be seen, the input clock signal $CLK_{in}$ here has a period length of the decimal value 8 during the initial 4 rows (i.e. corresponding to eight periods of the sampling clock). Then, between row 5 and 11, the period length increases to the decimal value 14; and finally, as of row 12, the period length drops to the decimal value 4. It should further be noted that instead of as in this example, where there are approximately 10 sampling clock periods for each period of the input clock signal $CLK_{in}$, in an actual implementation the sampling clock frequency should preferably be selected such that there are around 100 sampling clock periods for each period of the input clock signal $CLK_{in}$.

Column 3 of Table 1 shows the rolling sum of four period length values PL. Note that we assume that there is one row's delay in the calculation. This becomes apparent for example on row 5 when the period length value PL changes from 8 to 14, and the rolling sum changes first on row 6.

Column 4 of Table 1 shows a so-called corrected rolling sum. A first correction here occurs on row 7, where an error term from the preceding row (i.e. row 6) in the column 7 is added. The error term of column 7 compensates for any difference between the calculated average period length $PL_{cavg}$ and the average period length value $PL_{avg}$, and is discussed further below with reference to column 7.

Column 5 of Table 1 shows an average value of the corrected rolling sum obtained by dividing the value of column 4 by four, which is here the number of period length values PL over which averaging is performed to determine the average period length value $PL_{avg}$.

Column 6 of Table 1 shows the value of column 5 rounded down to an integer number. Please note the numbers in column 6 correspond to the period length values of the output clock signal $CLK_{out}$, and these period length values, in turn, can be regarded as a low-pass filtered version of the period length values PL of the input clock signal $CLK_{in}$.

Column 7 values of Table 1 at each row represent an error term that is obtained by subtracting the value in column 5 from the value in column 6, and then multiplying this value by 4 (i.e. representing the averaging interval).

The respective time points at which each cycle of the input clock signal $CLK_{in}$ starts are obtained by accumulating the period length values PL in column 2. Column 8 of Table 1 represents these time points, which likewise correspond to the number of clock pulses of the sampling clock $CLK_{smpl}$ received since time zero.

Column 9 specifically shows the points in time for the pulses of the output clock signal $CLK_{out}$. The values in column 8 have been obtained simply by accumulating the numbers in column 2 up to a given row.

Note that in row 5 the output number of column 9 is 40, while the input number of column 8 is 46 (i.e. a higher number). This is an example of a so-called non-causal behavior, which cannot occur in a real system. The problem behind this phenomenon is that the information needed to create a pulse of the output clock signal $CLK_{out}$ at the point in time t=40 is not obtained until the point in time t=46.

This non-causal behavior is explained by the fact that the frequency of the input clock signal $CLK_{in}$ decreases on row 5, while the input period length values PL increase from 8 to 14. To eliminate the non-causal behavior, a sufficiently large offset number is added to the calculated points time when the pulses of the output clock signal $CLK_{out}$ are to be generated. Here, we have chosen an offset of 15, which is represented in column 10 of Table 1. As can be seen, some input points in time (column 8) are identical to some output points in time (column 10). This means that the system is at the very brink of non-causal behavior. Thus, here, 15 is indeed the minimal possible offset value.

Preferably, an offset number (relatively large) is added to an initial calculated point in time for the output clock signal $CLK_{out}$. Thereby, any non-causal behavior caused by lower frequencies, jitter and phase modulation can be handled by the clock regenerator.

In the first rows of columns 10 and 9, it is apparent that the pulses of the output clock signal $CLK_{out}$ are created 15 sampling clock pulses after the point in time when the clock regenerator is "aware" of that this clock pulse in question shall be produced.

This means that as long as the input clock signal $CLK_{in}$ has the period length 8, there is a margin to non-causal behavior of 15 (i.e. up to row 4). However, when the frequency decreases, so that the period length becomes 14, the margin has been reduced to 0.

TABLE 1

| | Column | | | | | | | | |
|---|---|---|---|---|---|---|---|---|---|
| Row | 2 Input period length, PL | 3 Rolling sum | 4 Corr. rolling sum | 5 Av. of corr. rolling sum | 6 Output, rounded down | 7 REV | 8 Input time | 9 Output time | 10 Output time + offset |
| 1 | 8 | 32 | 32 | 8 | 8 | 0 | 8 | 8 | 23 |
| 2 | 8 | 32 | 32 | 8 | 8 | 0 | 16 | 16 | 31 |
| 3 | 8 | 32 | 32 | 8 | 8 | 0 | 24 | 24 | 39 |
| 4 | 8 | 32 | 32 | 8 | 8 | 0 | 32 | 32 | 47 |
| 5 | 14 | 32 | 32 | 8 | 8 | 0 | 46 | 40 | 55 |
| 6 | 14 | 38 | 38 | 9.5 | 9 | 2 | 60 | 49 | 64 |
| 7 | 14 | 44 | 46 | 11.5 | 11 | 2 | 74 | 60 | 75 |
| 8 | 14 | 50 | 52 | 13 | 13 | 0 | 88 | 73 | 88 |
| 9 | 14 | 56 | 56 | 14 | 14 | 0 | 102 | 87 | 102 |
| 10 | 14 | 56 | 56 | 14 | 14 | 0 | 116 | 101 | 116 |
| 11 | 14 | 56 | 56 | 14 | 14 | 0 | 130 | 115 | 130 |
| 12 | 4 | 56 | 56 | 14 | 14 | 0 | 134 | 129 | 144 |
| 13 | 4 | 46 | 46 | 11.5 | 11 | 2 | 138 | 140 | 155 |
| 14 | 4 | 36 | 38 | 9.5 | 9 | 2 | 142 | 149 | 164 |
| 15 | 4 | 26 | 28 | 7 | 7 | 0 | 146 | 156 | 171 |
| 16 | 4 | 16 | 16 | 4 | 4 | 0 | 150 | 160 | 175 |
| 17 | 4 | 16 | 16 | 4 | 4 | 0 | 154 | 164 | 179 |
| 18 | 4 | 16 | 16 | 4 | 4 | 0 | 158 | 168 | 183 |
| 19 | 4 | 16 | 16 | 4 | 4 | 0 | 162 | 172 | 187 |
| 20 | 4 | 16 | 16 | 4 | 4 | 0 | 166 | 176 | 191 |

According to one preferred embodiment of the invention, the demultiplexing module 210 is configured to produce a read-out clock signal CLKo1 and CLKo2 respectively in respect of each of the different synchronization sources. Each read-out clock signal CLKo1 and CLKo2 includes trains of clock pulses, where each train of clock pulses contains a number of clock pulses equal to the number of bits included in each frame of the TDM structure.

In this embodiment, the second node 200 further includes at least one buffer means 251 and 252. Each buffer means 251 and 252 is configured to consecutively receive the bits of the output data signal sets d-out1 and d-out2 respectively at an input rate specified by the applicable read-out clock signal CLKo1 or CLKo2. The buffer means 251 and 252 respectively temporarily stores a predetermined number of the received bits of the demultiplexed data signal sets d-out1 and d-out2, and thereafter feeds out these bits consecutively at an output rate specified by the cleaned demultiplexed clock signal CLKdm1' and CLKdm2' from the broad-band jitter attenuating modules 271 and 272 respectively.

According to another preferred embodiment of the invention, the first node 100 includes at least one divider module. FIG. 2b shows two such modules, 151 and 152 respectively, configured to receive each extracted clock signal CLKex1 and CLKex2 and in response thereto produce a resulting down-converted extracted clock signal CLKex1/F and CLKex2/G respectively. The downconverted extracted clock signals CLKex1/F and CLKex2/G have a reduced frequency representing a predetermined fraction 1/F and 1/G respectively of the frequency of the extracted clock signal extracted clock signals CLKex1 and CLKex2.

The predetermined fraction may be ½. In such a case, the first node 100 creates a so-called half-clock, which means that instead of for example a 2.048 MHz signal, a 1.024 MHz is transmitted through the system. Naturally, bandwidth is thereby saved. Note that a half-clock likewise corresponds to a 2.048 Mbps bit stream with the data pattern 101010 etc. It should also be noted that, according to the invention, other predetermined fractions 1/F and 1/G may equally well be used, e.g. ⅓ or ¼.

In any case, if the first node 100 includes at least one divider module 151 and/or 152, the second node 200 must include at least one corresponding multiplier module 261 and/or 262, which is configured to multiply each demultiplexed sampled clock signal CLK/F and CLK/G with a factor representing the inverse F and G of said predetermined fraction 1/F and 1/G respectively before feeding the clock signal to the interface module 221 and 222 respectively.

Nevertheless, the specific order between multiplier modules 261 and 262 and the broad-band jitter attenuating modules 271 and 272 in the processing chain is irrelevant. This means that the multiplier modules 261 and 262 may instead equally well operate on the cleaned demultiplexed clock signals CLKdm1'/F and CLKdm2'/G (not shown in FIG. 2b) respectively.

Figure 2C:
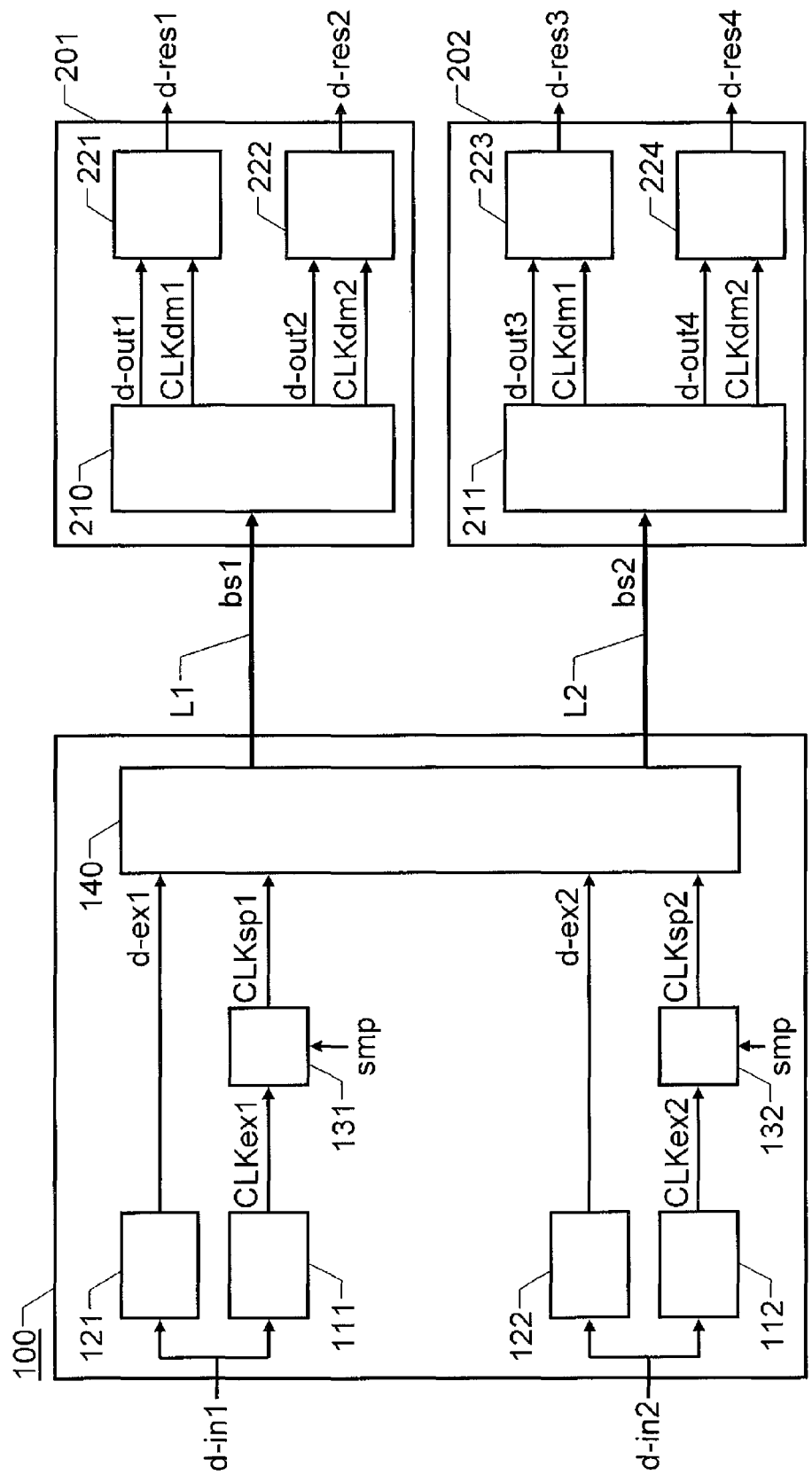
FIG. 2c illustrates the node configuration of FIG. 1 with further reference to certain features of the present invention.

FIG. 2c illustrates the node configuration of FIG. 1 with further reference to certain features of the invention. In contrast to FIG. 1, however, for reasons of a clear presentation no signals representing the GBE signals are shown in FIG. 2c. Nevertheless, in FIG. 2c, all units, signals and values bearing the same reference signs as those also occurring in FIGS. 2a and/or 2b designate the same units, signals and values respectively as described above with reference to FIGS. 2a and/or 2b, and will therefore not be repeated below.

Analogous to the example shown in FIG. 1, in FIG. 2c, the first node 100 is connected to two second nodes 201 and 202 via first and second transmission lines L1 and L2. We further presume that the sets of input data signals d-in1 and d-in2 includes signals being based on two different synchronization sources, and that signals from each of these groups are transmitted to each of the second nodes 201 and 202. Here, the resulting clock-carrying signals are designated d-res1 and d-res3 respective d-res2 and d-res 4. Consequently, the sampled clock signals CLKsp1 and CLKsp2 representing both synchronization sources must be included in a first bit stream bs1 transmitted via a the first transmission line L1 as well as in a second bit stream bs2 transmitted via the second transmission line L2. Moreover, the second nodes 201 and 202 must include a respective interface module 221, 222, 223 and 224 for recombining each output data signal in the data signal sets d-out1, d-out2, d-out3 and d-out4 with relevant demultiplexed clock signal CLKdm1 and CLKdm2.

Figure 3:
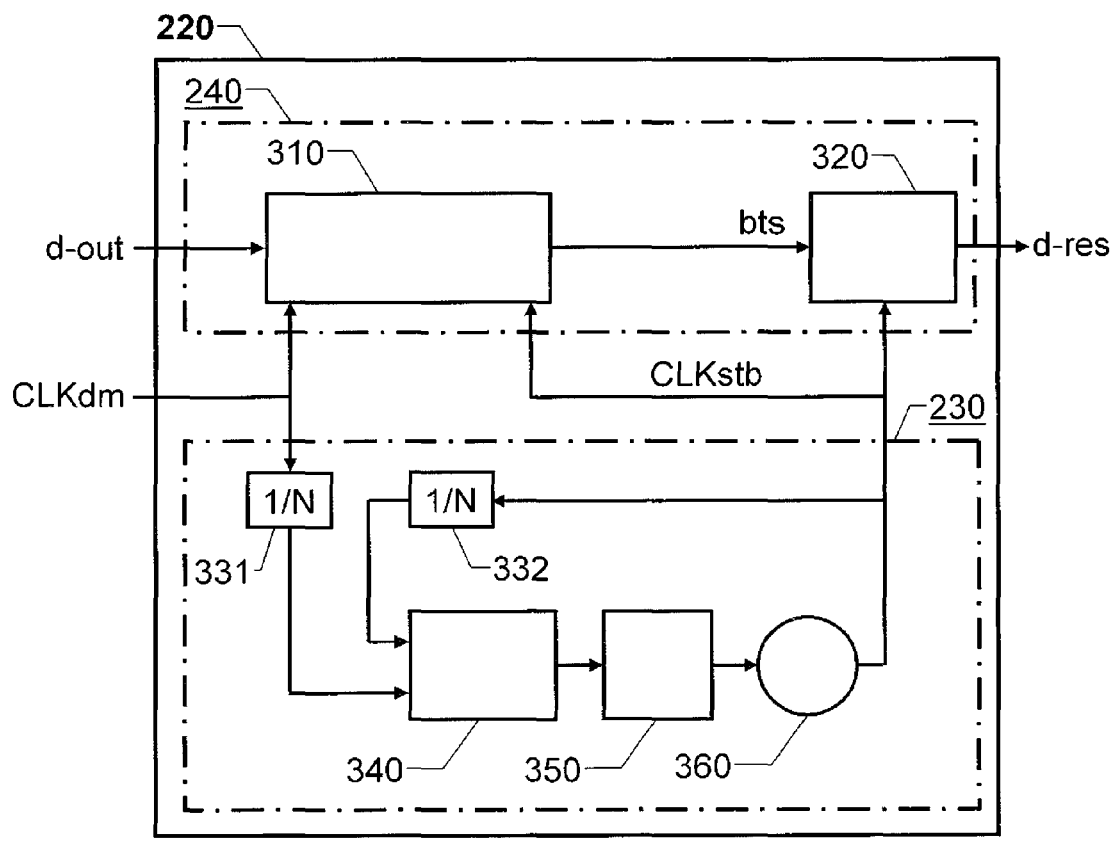
FIG. 3 shows a block diagram of an interface module according to one embodiment of the invention.

Turning now to FIG. 3, we see a block diagram of an interface module 220 according to one embodiment of the invention (cf. the modules 221 and 222 of FIGS. 2a and 2b, and modules 221-224 of FIG. 2c). In this embodiment, a narrow-band jitter attenuating means 230 is integrated into the interface module 220 together with a data-feed module 240. The narrow-band jitter attenuating means 230 includes PLL circuitry 331, 332, 340, 350 and 360; and the data-feed module 240 includes a buffer module 310 and a line adapter module 320.

The buffer module 310 is configured to consecutively receive bits of the output data signal set d-out at an input rate specified by the demultiplexed clock signal CLKdm that is associated with the output data signal set d-out in question. The buffer module 310 temporarily stores a predetermined number of bits of the demultiplexed data signal, and is thereafter configured to feed out said bits bts to the line adapter module 320. The bits bts are here fed out consecutively at a final output rate specified by the stabilized clock signal CLKstb that is associated with the output data signal set d-out in question.

The stabilized clock signal CLKstb, in turn, is generated by the narrow-band jitter attenuating means 230. Specifically, a first divider module 331 therein receives the demultiplexed clock signal CLKdm, and a second divider module 332 receives the stabilized clock signal CLKstb. Both the first and second divider modules 331 and 332 divide its respective input signal CLKdm and CLKstb by a suitable factor N to produce resulting signals at reduced frequencies. A phase comparator 340 receives the reduced-frequency signals, and in response thereto produces an input to a loop filter 350. The loop filter 350, in turn, controls a voltage-controlled oscillator 360 generating the stabilized clock signal CLKstb. Hence, the data bits stored in the buffer module 310 are fed out at a final output rate being specified by the stabilized clock signal CLKstb, which in turn, is based on the demultiplexed clock signal associated with the output data signal set d-out.

The line adapter module 320 is configured to consecutively forward data bits bts that are output from the buffer module 310 to an output terminal at said final output rate. Thus, the signal on the output terminal represents the resulting clock-carrying data signal d-res from the second node.

Figure 4:
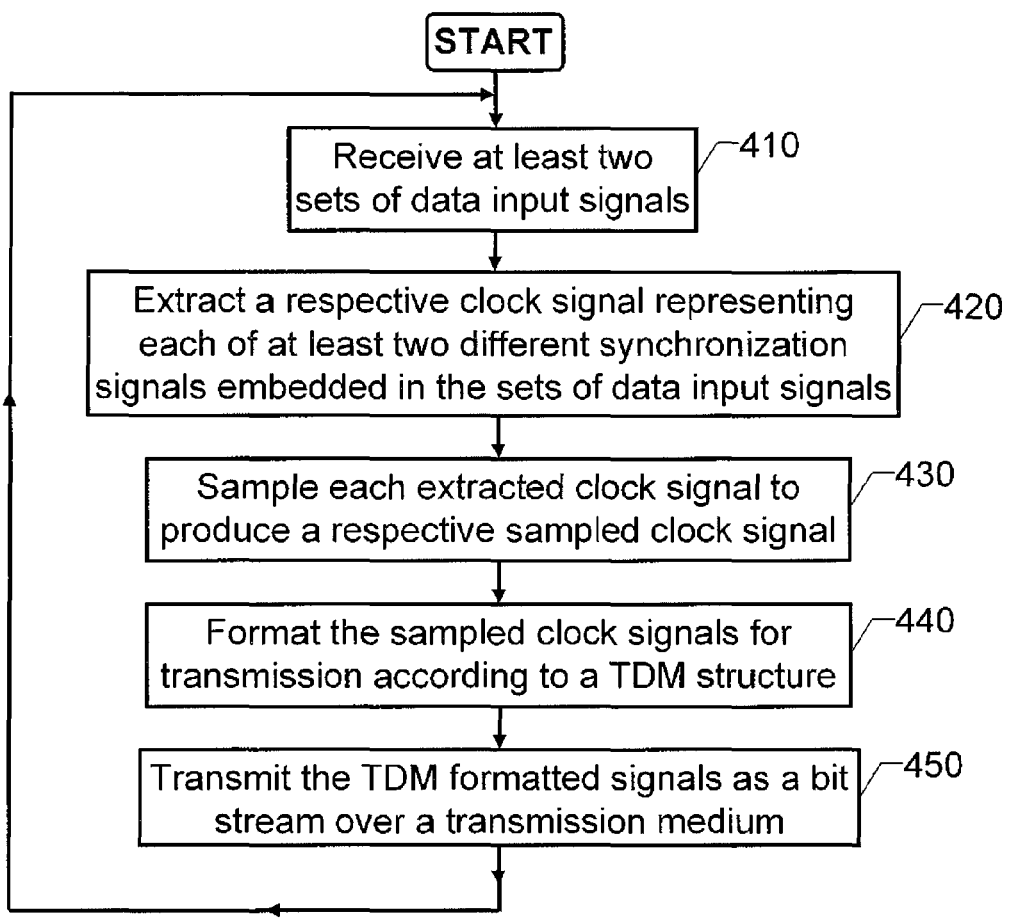
FIG. 4 illustrates, by means of a flow diagram, a general method implemented in a proposed transmitter node.
Figure 5:
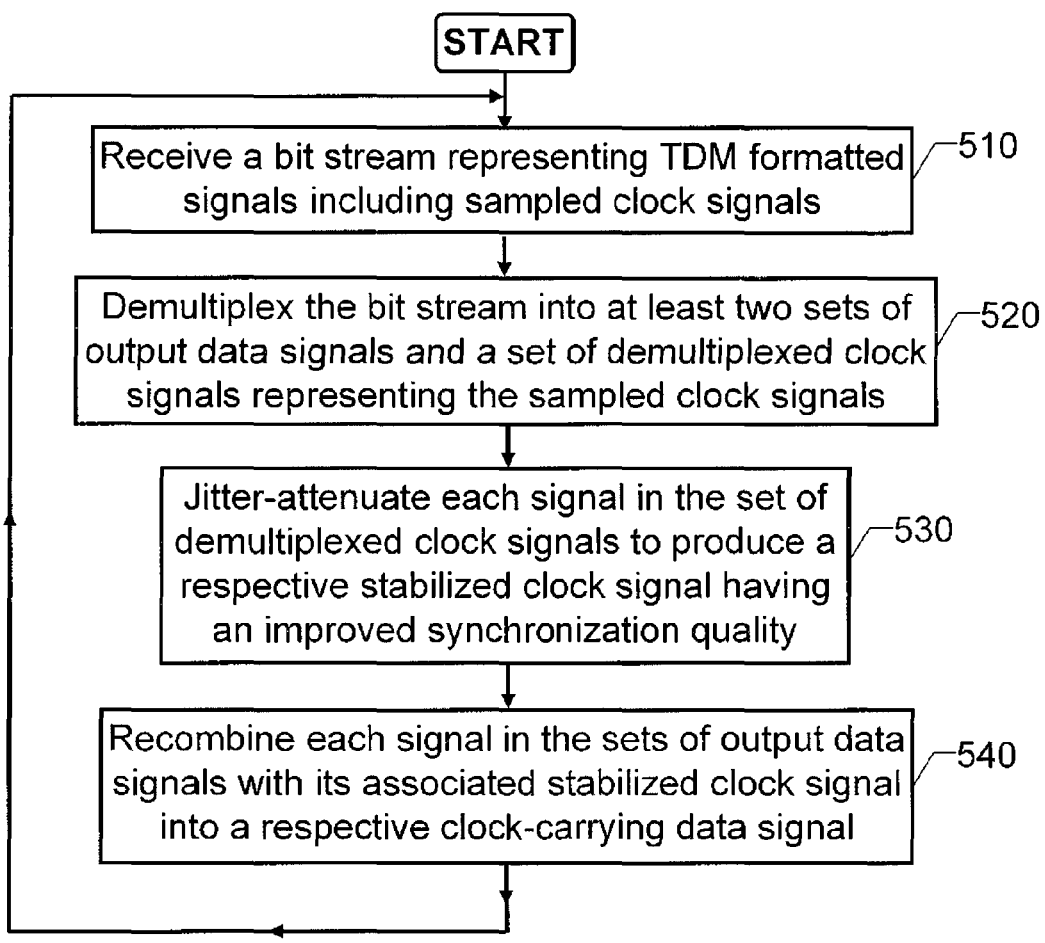
FIG. 5 illustrates, by means of a flow diagram, a general method implemented in a proposed receiver node.

To sum up, we will now describe the general method of multiplexing, transmitting and demultiplexing data signals according to the invention with reference to the flow diagrams in FIGS. 4 and 5. Here, FIG. 4 illustrates the procedure on the transmitter side, and FIG. 5 illustrates the procedure on the receiver side.

In FIG. 4, an initial step 410 receives at least two sets of input data signals. The sets of input data signals include at least two data signals each into which a clock signal is embedded. Specifically, the sets of input data signals include at least one first signal and at least one second signal, where the at least one first signal is based on a synchronization source different from a synchronization source upon which the at least one second signal is based. A step 420 then extracts from the input data signals a respective clock signal representing each of the different synchronization sources. Subsequently, a step 430 samples each of the extracted clock signals into a respective resulting sampled clock signal based on a sampling frequency. The sampling frequency, in turn, is synchronized with a line frequency used for transmitting the signals in the form of a bit sequence (see step 450 below). Thereafter, a step 440 formats the sampled clock signals for transmission according to a TDM structure together with extracted data signals, which have also been extracted from the sets of input data signals. Then, a step 450 transmits the TDM formatted signals as a bit stream over a transmission medium. Finally, the procedure loops back to step 410 again. Naturally, in an actual implementation, data is received continuously, and therefore all steps 410 to 450 are executed simultaneously, however with respect to different pieces of data.

In FIG. 5, an initial step 510 receives a bit stream via a transmission medium. The bit stream has a line frequency and represents TDM formatted signals including extracted data signals as well as sampled clock signals representing at least one first signal and at least one second signal, where the at least one first signal is based on a synchronization source different from a synchronization source upon which the at least one second signal is based. A step 520 thereafter, demultiplexes the bit stream into at least two sets of output data signals respective a set of demultiplexed clock signals representing the resulting sampled clock signals. Subsequently, a step 530 performs jitter-attenuation with respect to each signal in the set of demultiplexed clock signals to reduce an amount of frequency jitter to below a predefined level. Thus, a respective clock signal is produced, which has a synchronization quality being superior to the synchronization quality of the signals in the set of demultiplexed clock signals. After that, a step 540 recombines each data signal in the sets of output data signals with its associated clock signal into a respective resulting clock-carrying data signal, and finally the procedure loops back to step 510 again. Analogous to the above, in an actual implementation, data bits are received continuously, and therefore all steps 510 to 540 are executed simultaneously, however with respect to different pieces of data.

All of the steps, as well as any sub-sequence of steps, described with reference to FIGS. 4 and 5, above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM, for example a DVD, a CD, an EPROM, an EEPROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or in any other country.

The invention is not restricted to the described embodiments in the figures, but may be varied freely within the scope of the claims.

The invention claimed is:

1. A data transmission system, comprising:
   a first node configured to: receive at least two sets of input data signals, said at least two sets including at least two data signals each into which a clock signal is embedded; and format said sets for transmission according to a Time Division Multiplexing (TDM) structure;
   a transmission medium configured to transmit the TDM formatted signals as a bit stream having a line frequency; and
   a second node configured to: receive the bit stream and demultiplex the bit stream into at least two sets of output data signals, characterized in that the at least two sets input data signals include at least one first signal and at least one second signal, the at least one first signal being based on a synchronization source which is different from a synchronization source upon which the at least one second signal is based,
   wherein:
      the first node comprises:
         at least one clock extraction device configured to extract a respective clock signal representing each of said different synchronization sources from said at least one first and second signals,
         at least one sampling device configured to sample each of the extracted clock signals to a respective resulting sampled clock signal based on a sampling frequency which is synchronized with the line frequency, and
         a multiplexing device configured to incorporate each of the resulting sampled clock signals as a respective separate signal in the TDM; and
      the second node comprises:
         a demultiplexing device configured to demultiplex the received bit stream into at least two sets of output data signals and a set of demultiplexed clock signals representing the resulting sampled clock signals,
         at least one jitter attenuating device configured to, in each signal in the set of demultiplexed clock signals, reduce an amount of frequency jitter to below a predefined level and thus produce a respective clock signal having a synchronization quality being superior to the synchronization quality of the signals in the set of demultiplexed clock signals, and
         at least one interface device configured to combine each data signal in the at least two sets of output data signals with its associated clock signal into a respective resulting clock-carrying data signal in a data signal set.

2. The data transmission system according to claim 1, wherein the second node comprises at least one narrow-band jitter attenuating device configured to, in each signal in the set of demultiplexed clock signals, reduce an amount of frequency jitter to below a predefined level and thus produce a respective stabilized clock signal.

3. The data transmission system according to claim 2, wherein the at least one narrow-band jitter attenuating device is associated with a buffer device configured to consecutively receive bits of the output data signal at an input rate specified by the demultiplexed clock signal being associated with the output data signal, temporarily store a predetermined number of bits of the demultiplexed data signal, and thereafter feed out said bits to a line adapter device, said bits being fed out consecutively at a final output rate specified by the stabilized clock signal based on the demultiplexed clock signal associated with the output data signal; and
   the line adapter device being configured to consecutively forward said output bits to an output terminal at the final output rate to thus represent the resulting clock-carrying data signal.

4. The data transmission system according to claim 3, wherein at least one of the at least one narrow-band jitter attenuating device is integrated into at least one of the at least one interface device.

5. The data transmission system according to claim 1, wherein the second node comprises at least one broad-band jitter attenuating device configured to:
   receive a respective demultiplexed clock signal;
   reduce frequency jitter above a threshold frequency in said demultiplexed clock signals, thereby producing resulting cleaned demultiplexed clock signals; and
   forward the resulting cleaned demultiplexed clock signals to the at least one narrow-band jitter attenuating device.

6. The data transmission system according to claim 5, wherein at least one of the at least one broad-band jitter attenuating device comprises a phase-locked-loop circuit configured to reduce the frequency jitter above a threshold frequency.

7. The data transmission system according to claim 5, wherein at least one of the at least one broad-band jitter attenuating device comprises a resonant circuit configured to reduce the frequency jitter above a threshold frequency.

8. The data transmission system according to claim 5, wherein at least one of the at least one broad-band jitter attenuating device comprises a clock regenerator configured to:
   receive each demultiplexed clock signal,
   produce, repeatedly, a respective average period length value representing an average period time for the demultiplexed clock signal over an averaging interval including a number of clock periods, and
   produce the cleaned demultiplexed clock signal based on said average period length values.

9. The data transmission system according to claim 1, wherein the demultiplexing device is configured to produce a read-out clock signal in respect of each of said different synchronization sources, the read-out clock signal including trains of clock pulses, where each train of clock pulses contains a number of clock pulses equal to the number of bits included in each frame of the TDM, and the second node further comprises at least one buffer device configured to:
   receive bits of the output data signal consecutively at an input rate specified by the read-out clock signal,
   temporarily store a predetermined number of the received bits of the demultiplexed data signal, and thereafter
   feed out said bits consecutively at an output rate specified by the cleaned demultiplexed clock signal.

10. The data transmission system according to claim 1, wherein the at least one sampling device of the first node is configured to sample each of the extracted clock signals based on a sampling frequency representing an oversampling factor above one relative to the frequency of the extracted clock signal.

11. The data transmission system according to claim 10, wherein the first node comprises at least one divider device configured to receive each extracted clock signal and in response thereto produce a resulting downconverted extracted clock signal having a reduced frequency representing a predetermined fraction of the frequency of the extracted clock signal.

12. The data transmission system according to claim 11, wherein the second node comprises at least one multiplier device configured to multiply each demultiplexed sampled clock signal, or a cleaned version thereof, with a factor representing the inverse of said predetermined fraction before feeding the clock signal to the interface device.

13. The data transmission system according to claim 1, wherein:
the first node comprises at least one data extraction device configured to extract a respective data signal representing payload information of each of the input data signals, and
the multiplexing device is configured to include each data signal in the sets of the extracted data signals as a respective separate signal in the TDM.

14. A data transmission method of comprising:
receiving, in a first node, at least two sets of input data signals, said at least two sets including at least two data signals each into which a clock signal is embedded; and format said sets for transmission according to a Time Division Multiplexing (TDM) structure;
transmitting the TDM formatted signals as a bit stream from the first node to a transmission medium, the bit stream having a line frequency;
receiving, via the transmission medium, the bit stream in a second node; and
demultiplexing, in the second node, the bit stream into at least two sets of output data signals;
characterized by the at least two sets of input data signals including at least one first signal and at least one second signal, the at least one first signal being based on a synchronization source which is different from a synchronization source upon which the at least one second signal is based, and the method comprising:
extracting, in the first node, a respective clock signal representing each of said different synchronization sources from said at least one first and second signals;
sampling, in the first node, each of the extracted clock signals to a respective resulting sampled clock signal based on a sampling frequency which is synchronized with the line frequency;
multiplexing, in the first node, each of the resulting sampled clock signals as a respective separate signal in the TDM;
demultiplexing, in the second node, the received bit stream into at least two sets of output data signals and a set of demultiplexed clock signals representing the resulting sampled clock signals;
jitter-attenuating, in the second node, in each signal in the set of demultiplexed clock signals to reduce an amount of frequency jitter to below a predefined level and thus produce a respective clock signal having a synchronization quality being superior to the synchronization quality of the signals in the set of demultiplexed clock signals, and
combining, in the second node, each data signal in the at least two sets of output data signals with its associated clock signal into a respective resulting clock-carrying data signal in a data signal set.

15. The method according to claim 14, comprising jitter-attenuating, in the second node, in each signal in the set of demultiplexed clock signals in a relatively narrow frequency band to reduce an amount of frequency jitter to below a predefined level and thus produce a respective stabilized clock signal.

16. The method according to claim 15, wherein said narrow-band jitter-attenuating comprises:
temporarily storing consecutively received bits of the output data signal, said bits having been received at an input rate specified by the demultiplexed clock signal associated with the output data signal; and thereafter
feeding out said bits to a line adapter device, said bits being fed out consecutively at a final output rate specified by the stabilized clock signal based on the demultiplexed clock signal associated with the output data signal; and
the line adapter device being configured to consecutively forward said output bits to an output terminal at the final output rate to thus represent the resulting clock-carrying data signal.

17. The method according to claim 15, comprising jitter-attenuating, in the second node, the set of demultiplexed clock signals in relatively broad frequency band by:
reducing frequency jitter above a threshold frequency in the set of demultiplexed clock signals, thereby producing resulting cleaned demultiplexed clock signals; and
forwarding the resulting cleaned demultiplexed clock signals to the at least one narrow-band jitter attenuating device.

18. The method according to claim 17, wherein said reducing frequency jitter above a threshold frequency in the demultiplexed clock signals comprises:
producing, repeatedly, a respective average period length value representing an average period time for the demultiplexed clock signal over an averaging interval including a number of clock periods; and
producing the cleaned demultiplexed clock signal based on said average period length values.

19. The method according to claim 15, wherein the demultiplexing comprises:
producing a read-out clock signal in respect of each of said different synchronization sources, the read-out clock signal including trains of clock pulses, where each train of clock pulses contains a number of clock pulses equal to the number of bits included in each frame of the TDM;
receiving bits of the output data signal consecutively at an input rate specified by the read-out clock signal;
storing, temporarily, a predetermined number of the received bits of the demultiplexed data signal; and thereafter
feeding out said bits consecutively at an output rate specified by the cleaned demultiplexed clock signal.

20. The method according to claim 15, wherein the sampling in the first node comprises sampling each of the extracted clock signals based on a sampling frequency representing an oversampling factor above one relative to the frequency of the extracted clock signal.

21. The method according to claim 20, comprising, producing in the first node and in response to each extracted clock signal, a resulting downconverted extracted clock signal having a reduced frequency representing a predetermined fraction of the frequency of the extracted clock signal.

22. The method according to claim 21, comprising, multiplying in the second node, each demultiplexed sampled clock signal, or a cleaned version thereof, with a factor representing the inverse of said predetermined fraction before feeding the clock signal to the interface device.

23. The method according to claim 15, comprising:
- extracting, in the first node, a respective data signal representing payload information of each data signal in the at least two sets of the input data signals; and
- multiplexing, in the first node, each of the extracted data signals as a respective separate signal in the TDM.

24. A computer program stored into a memory of a computer, comprising a software for controlling the steps of claim 14 when said program is run on the computer.

25. A non-transitory computer readable medium, having a program recorded thereon, where the program is to make a computer control the steps of claim 14 when the program is loaded into the computer.

* * * * *